(12) United States Patent
McKay (10) Patent No.: US 8,789,248 B2
(45) Date of Patent: Jul. 29, 2014

(54) CHAIN HOOK

(75) Inventor: Douglas McGregor McKay, Norlane (AU)

(73) Assignee: Turbo Hook Pty Ltd, Norlane, Victoria (AU)

( * ) Notice: Subject to any disclaimer, the term of this patent is extended or adjusted under 35 U.S.C. 154(b) by 0 days.

(21) Appl. No.: 13/819,438

(22) PCT Filed: Sep. 1, 2011

(86) PCT No.: PCT/AU2011/001110
§ 371 (c)(1),
(2), (4) Date: Feb. 28, 2013

(87) PCT Pub. No.: WO2012/027782
PCT Pub. Date: Mar. 8, 2012

(65) Prior Publication Data
US 2013/0160422 A1 Jun. 27, 2013

(30) Foreign Application Priority Data
Sep. 1, 2010 (AU) ................. 2010903928

(51) Int. Cl.
*A44B 11/00* (2006.01)
*A44B 13/00* (2006.01)
*F16G 15/04* (2006.01)

(52) U.S. Cl.
USPC .......... 24/599.1; 24/370; 24/595.1; 24/596.1; 24/592.1; 24/599.6; 24/599.7; 59/93; 59/85; 294/82.1

(58) Field of Classification Search
USPC ................. 24/318, 370, 592.1, 599.1, 595.1, 24/596.1, 599.6, 599.7; 59/93; 294/82.1
See application file for complete search history.

(56) References Cited

U.S. PATENT DOCUMENTS

| 290,785 | A |   | 12/1883 | Millard |
|---|---|---|---|---|
| 864,652 | A | * | 8/1907 | King ............................. 24/577.1 |
| 1,347,725 | A | * | 7/1920 | Weiss ................................ 59/85 |
| 1,605,953 | A | * | 11/1926 | O'Bannon .................... 428/113 |
| 1,709,235 | A | * | 4/1929 | Shaffer ....................... 294/82.19 |
| 3,289,258 | A | * | 12/1966 | Eriksson ..................... 294/82.18 |
| 4,273,371 | A | * | 6/1981 | Behnke et al. ............. 294/82.11 |
| 4,315,352 | A | * | 2/1982 | Wagner ....................... 24/598.5 |
| 5,692,270 | A | * | 12/1997 | Dunn ........................... 24/116 R |
| 6,568,165 | B2 | * | 5/2003 | Smetz ................................ 59/93 |
| 6,941,622 | B1 | * | 9/2005 | Hung ............................ 24/599.1 |

FOREIGN PATENT DOCUMENTS

EP 1 300 360 A1 4/2003

OTHER PUBLICATIONS

International Search Report for PCT/AU2011/001110, mailed Dec. 6, 2011; ISA/AU.

\* cited by examiner

*Primary Examiner* — David B Jones
(74) *Attorney, Agent, or Firm* — Harness, Dickey & Pierce, PLC (57) ABSTRACT

The present invention provides a chain hook which reduces the risk of disengagement of one or more chains connected thereto. The chain hook comprises an elongate body, a first hook at a first end of the elongate body for connection to a load and a second hook at a second end of the elongate body for connection to at least one chain, wherein the first and second hooks are in different planes.

31 Claims, 5 Drawing Sheets

CHAIN HOOK

FIELD OF THE INVENTION

The present invention relates to chain hooks. In particular, but not exclusively, the present invention relates to a chain hook for hoist chains. The present invention has particular application for hoist chains used in the wind turbine industry. However, it will be appreciated that the present invention has broader application and is not limited to that particular use.

BACKGROUND TO THE INVENTION

Hoist chains or lifting chains are commonly used with hoist devices and cranes for lifting loads. There are various types of hooks which can be attached to these chains such as hoisting or lifting hooks, shortening hooks and sling hooks.

Lifting hooks comprise a substantially arcuate hook or u-shaped hook and are usually equipped with a slip-prevention device such as a safety latch, to prevent the disengagement of the hoist chain, wire rope sling or rope to which a load is attached. However, in the event that the slip-prevention device fails, the chain can escape from the hook.

Shortening hooks are commonly used in chain suspension systems which can have several chains. The shortening hooks generally comprise an open u-shaped hook for receiving a chain link at one end and a pin-hole cable connection at an opposing end for receiving a connection to a load. However, as a load is raised and lowered the chain link can move on the hook and escape from the hook. Various modifications have been made to alter the design of these types of hooks to limit the likelihood of movement of the chain and for specific applications. However, in certain circumstances it is still be possible for the chain link engaged in the hook to slip from the hook and escape.

In this specification, the terms "comprises", "comprising" or similar terms are intended to mean a non-exclusive inclusion, such that a method and/or apparatus that comprises a list of elements does not include those elements solely, but may well include other elements not listed.

OBJECT OF THE INVENTION

It is a preferred object of the present invention to provide a hook device that addresses or at least ameliorates one or more of the aforementioned problems of the prior art.

It is a preferred object of the present invention to provide a hook device comprising hook portions at opposing ends of the hook device to securely engage one or more chains connected thereto.

It is a further preferred object of the present invention to provide a hook device which facilitates balancing a load to reduce stress placed on components of the hook device and/or an engaged link of a chain.

SUMMARY OF THE INVENTION

According to one aspect, although not necessarily the broadest aspect, the present invention resides in a chain hook comprising:
 an elongate body;
 a first hook at a first end of the elongate body for connection to a load; and
 a second hook at a second end of the elongate body for connection to at least one chain;
 wherein the first and second hooks are in different planes.

Preferably, the first hook is in the same plane as the elongate body.

Preferably, the second hook is inclined relative to the elongate body and the first hook.

Preferably, the second hook is inclined at an angle greater than ninety degrees and less than one hundred and eighty degrees relative to the plane of the elongate body.

Preferably, the first hook comprises a first fastening member coupled to a tail end of the first hook for securing connection to a load.

Suitably, the first fastening member is a latch.

Suitably, the latch is attached to the elongate body via a roll pin to allow the latch to pivot between an open position and a closed position.

Suitably, the latch is biased in a closed position via a torsion spring.

Suitably, a tip of the first hook comprises a recessed portion having a flange for receiving the latch when the latch is in a closed position.

Suitably, the latch comprises a slot for receiving the flange of the first hook to resist side loading.

Suitably, the second hook comprises a substantially u-shaped hook terminating in a nose portion spaced apart from the elongate body.

Preferably, the second hook comprises a second fastening member.

Suitably, the second fastening member is a latch.

Suitably, the latch is coupled to the body with a pin or rod to allow the latch to pivot between an open position and a closed position.

Suitably, the latch is biased to the closed position via a torsion spring within the body.

In some embodiments, the chain hook comprises at least one safety member associating with the first hook and/or the second hook to prevent accidental release respectively of the load and/or the chain.

Preferably, the first hook has a first safety member in the form of a safety pin slidable between a closed position and an open position.

Suitably, the safety pin comprises a pin positioned within a channel of the latch of the first hook.

Suitably, the safety pin has a roll pin or rod which protrudes from either side of the pin.

Suitably, the roll pin passes through corresponding apertures provided in a pair of side walls of the latch of the first hook.

Suitably, the safety pin is biased in a closed position via a helical spring.

Suitably, a tip of the pin extends beyond a tip of the latch of the first hook to rest against the flange of the first hook in a closed position.

Preferably, the second hook has a second safety member in the form of a safety latch.

Suitably, the safety latch is attached to the second hook via a roll pin or rod to allow the safety latch to pivot between a first position and a second position.

Suitably, the roll pin is passed through corresponding apertures provided in the tail end of the second hook and in the safety latch to pivotably attach the safety latch of the second hook directly beneath and abutting the latch of the second hook.

Suitably, the safety latch is biased in the first position via a torsion spring to prevent release of the latch of the second hook.

In some embodiments, the second hook comprises an aperture provided in a tail end of the hook for receiving the second fastening member therethrough.

In some embodiments, the second fastening member is a locking pin.

Suitably, the nose portion of the second hook has an aperture for retaining an end of the locking pin.

Suitably, an opposing end of the locking pin is provided with a ring member to release the locking pin from the closed position.

In particular, the chain hook is for use in conjunction with a hoist chain and is of particular use with hoist chains used in the wind turbine industry.

In another embodiment, the body of the chain hook comprises a pivot which enables the first hook and second hook to pivot relative to each other.

Further features and forms of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Embodiments of the present invention will be described with reference to a chain hook suitable for use in conjunction with a hoist chain which has particular application in the wind farm industry. However, it should be appreciated that embodiments of the present invention provide a chain hook which can be used with lifting chains in other applications/industries, such as construction, bridge building, film stage industry, the crane industry or the like. It will be appreciated that variations to the embodiments described herein may need to be made as required for particular applications that will nonetheless fall within the scope of the present invention.

Figure 1:
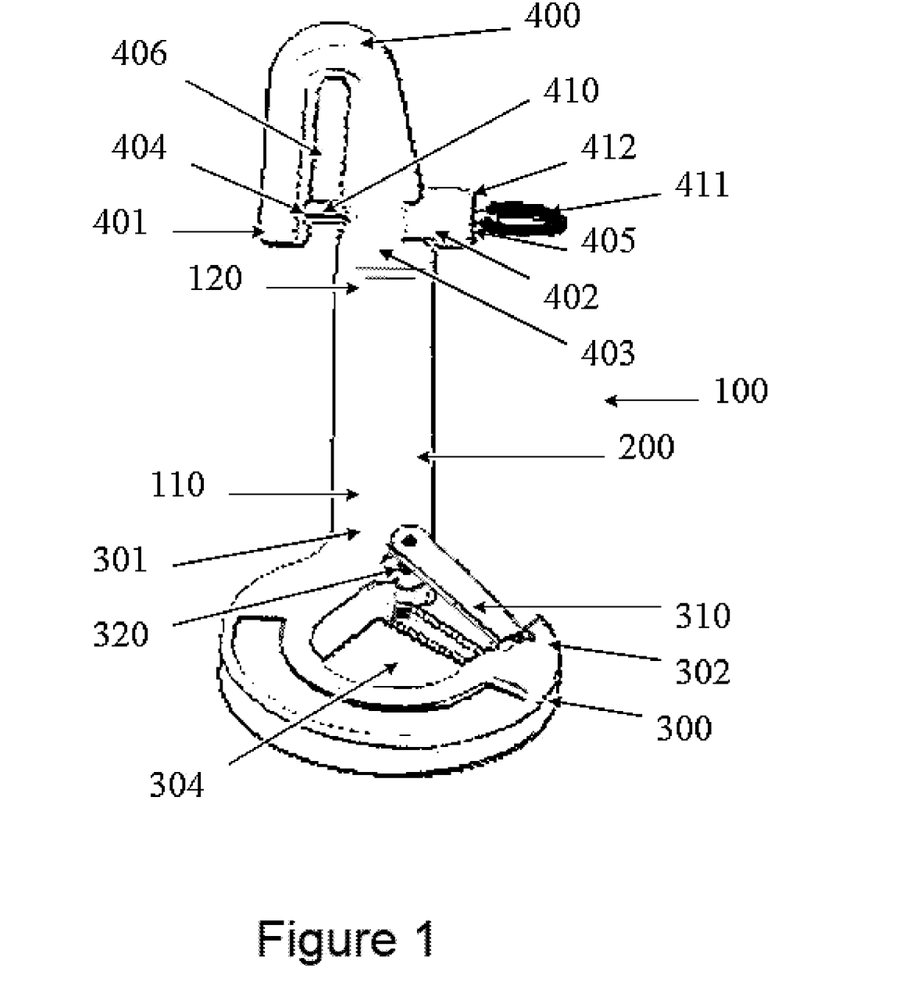
FIG. 1 is a perspective view of a chain hook according to a first embodiment of the present invention.

Referring to FIG. 1, the chain hook 100 is provided in accordance an embodiment of the present invention. The chain hook 100 comprises a body 200. The body 200 is an elongate body comprising a first end 110 having a first hook 300 and a second end 120 having a second hook 400, which reduces the risk of disengagement of a chain connected thereto. It is envisaged that the chain hook 100 can be made of a metal alloy material or any other suitable material. It is further envisaged that the shape and dimensions of the first hook 300 and second hook 400 may be varied to suit different applications. The first hook 300 and second hook 400 are integrally formed with the body 200 of the chain hook 100, for example by forging, such that the first hook 300 and second hook 400 are in different planes. In an alternative embodiment, it is envisaged that the first hook 300 and second hook 400 may be welded to the body 200 of the chain hook 100.

FIG. 1 shows the first hook 300 provided at the first end 110 of the body 200. A plane of the first hook 300 is in the same plane as the body 200. According to some embodiments, the first hook is substantially arcuate. The first hook 300 comprises a first fastening member 310 coupled to a tail end 301 of the first hook 300 where the first hook 300 meets the body 200 of the chain hook 100. First fastening member 310 extends across a gap 304 between tail end 301 and a tip 302 of the first hook 300. The first fastening member 310 secures connection of the first hook 300 of the chain hook 100 to a load to be transported, for example via a hoist. The first fastening member 310 is in the form of a latch. The latch 310 is attached to the first hook 300 via a roll pin 320 to allow the latch 310 to pivot between an open position and a closed position. It is envisaged that any other suitable means of attachment which provides a pivotable connection for the latch 310 can also be adopted. In an alternative embodiment, it is envisaged that the fastening member 310 can be omitted from the first hook 300.

FIG. 1 shows the second hook 400 provided at a second end 120 of the body 200. The second hook 400 is inclined relative to the body 200 and relative to the first hook 300. Preferably, the second hook 400 is inclined at an angle greater than ninety degrees and less than one hundred and eighty degrees relative to the plane of the body 200. According to some embodiments, as illustrated in FIG. 1, the second hook 400 comprises a substantially u-shaped hook terminating in a nose portion 401 spaced apart from the elongate body 200. Preferably, the second hook 400 comprises a second fastening member 410 coupled to a tail end 403 of the second hook 400 for securing connection of the hook 100 to a chain.

According to a first embodiment of the present invention, as illustrated in FIG. 1, the second hook 400 comprises an aperture 405 provided in a protruding portion 402 of the tail end 403 of the second hook 400 for receiving the second fastening member 410 therethrough. In this embodiment, the second fastening member 410 is a locking pin. The nose portion 401 of the u-shaped shaped hook 400 has an aperture 404 for retaining an end of the locking pin 410. An opposing end of the locking pin has a ring member 411 to enable the locking pin 410 to be released from a closed position into an open position so that a link of a chain can be received within the space 406 between the nose portion 401 and the tail end 403 of the second hook 400. It is envisaged that the external surface of the protruding portion 402 surrounding the aperture can be protected via a washer 412 or the like.

According to further embodiments of the invention, as illustrated in FIGS. 2 to 7, the second fastening member 410 is in the form of a latch. The latch 410 is attached to the second hook 400 via a roll pin 420 or rod to allow the latch 410 to pivot between an open position and a closed position. Latch 410 is shown in the closed position in FIG. 2. The roll pin 420 is passed through corresponding apertures 421 provided in the tail end 403 of the second hook 400 and in latch 410 to pivotably attach the latch 410 to the second hook 400. It is envisaged that any other suitable means of attachment which provides a pivotable connection for the latch to the second hook 400 can also be adopted. In an alternative embodiment, it is envisaged that the second fastening member 410 can be omitted from the second hook 400.

Figure 2:
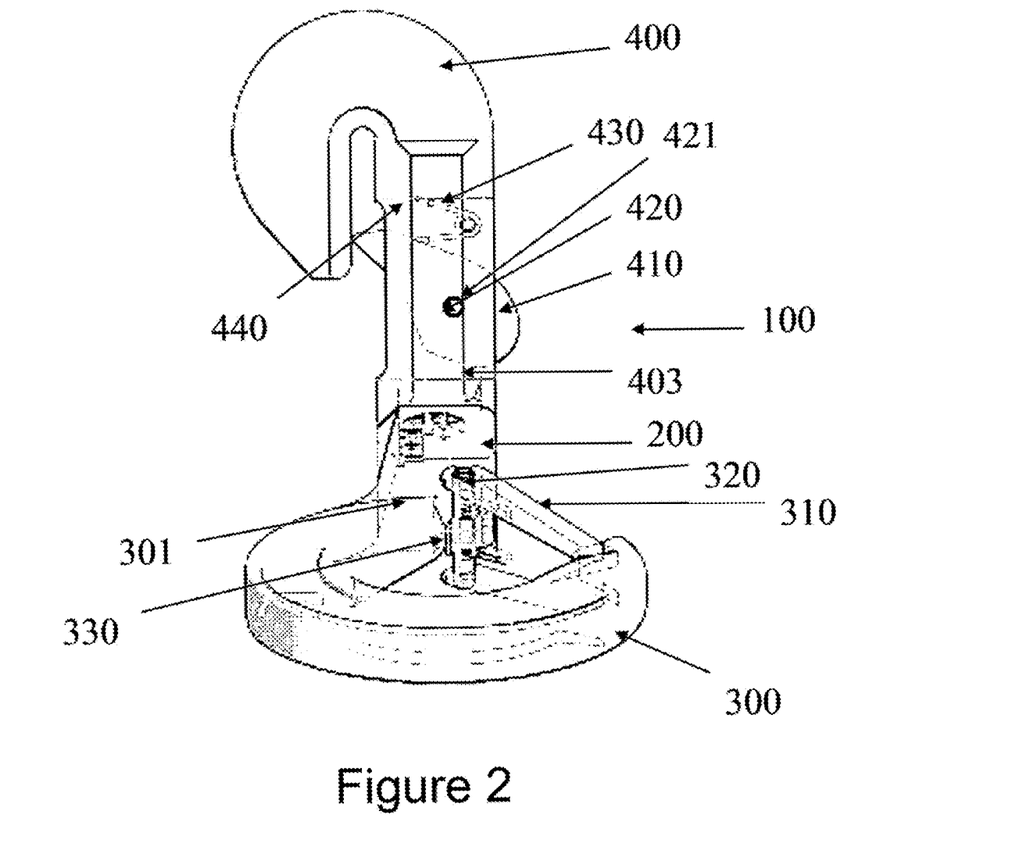
FIG. 2 is a perspective view of a chain hook according to an alternative embodiment of the present invention.

The latch 410 is biased in a closed position via a torsion spring 430 located within the body of the second hook 400. In an alternative embodiment, the torsion spring 430 may be attached externally to a surface of the tail end 403 of the second hook 400. A first end of the torsion spring 430 rests against an upper edge of the latch 410 and a second end of the torsion spring 430 rests against an internal wall or groove 440 of the second hook 400. In an alternative embodiment, the torsion spring 430 may have the same configuration as torsion spring 330 of the first hook 300 which is used to bias the latch 310 in a closed position. For example, the torsion spring 430 can be wrapped around the roll pin or rod 420. The wall/groove 440 can be provided within the tail end 403 of the second hook 400 such that the latch 410 can sit within the groove 440 or against the wall 440 and remain flush with the surface of the body 200 of the chain hook 100.

Figure 3:
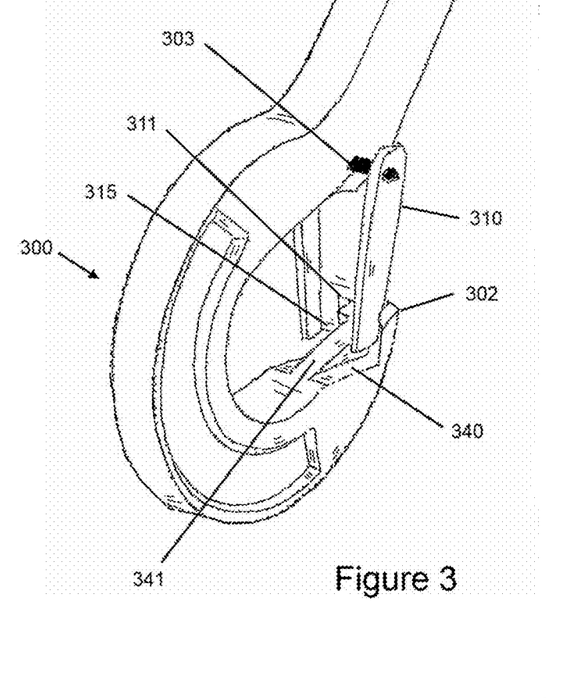
FIG. 3 is a close-up view of a first hook of the chain hook shown in FIGS. 1 and 2.

Referring now to FIG. 3, tip 302 of the first hook 300 comprises a flange 341 having a recessed portion 340 on either side for receiving a tip 315 of the latch 310 when the latch 310 is in a closed position. The latch 310 comprises a slot 311 for receiving the flange 341 of the first hook 300 to resist side loading. An aperture 303 is provided in the tail end 301 of the first hook to receive the roll pin 320.

Figure 4:
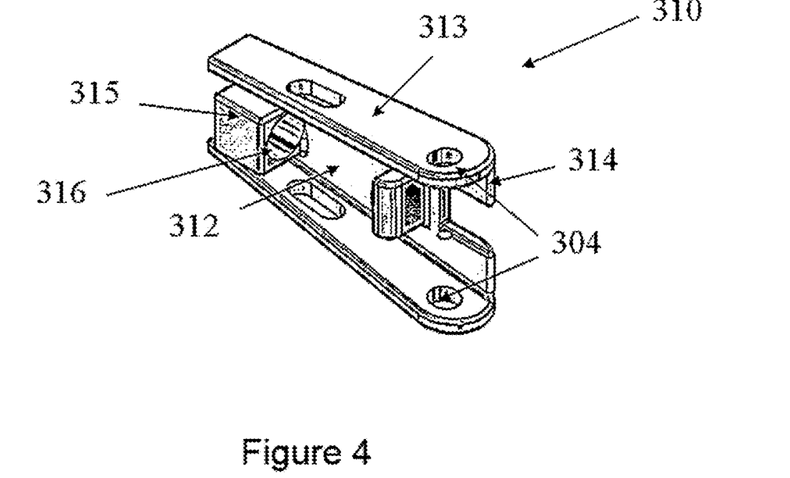
FIG. 4 is a perspective view of a latch of the first hook of the chain hook according to some embodiments of the present invention.

As illustrated in FIG. 4, a profile of the latch 310 for the first hook 300 comprises a channel 312 with side walls 313 and a base 314. A corresponding aperture 304 is provided in each side wall 313 of the latch 310 to receive the roll pin 320 to pivotably attach the latch 310 to the first hook. The latch 310 has a retaining member 315 having an aperture for receiving a pin 510 of a safety member therethrough as described below and enabling the pin 510 to slide between a closed position and an open position.

Figure 5:
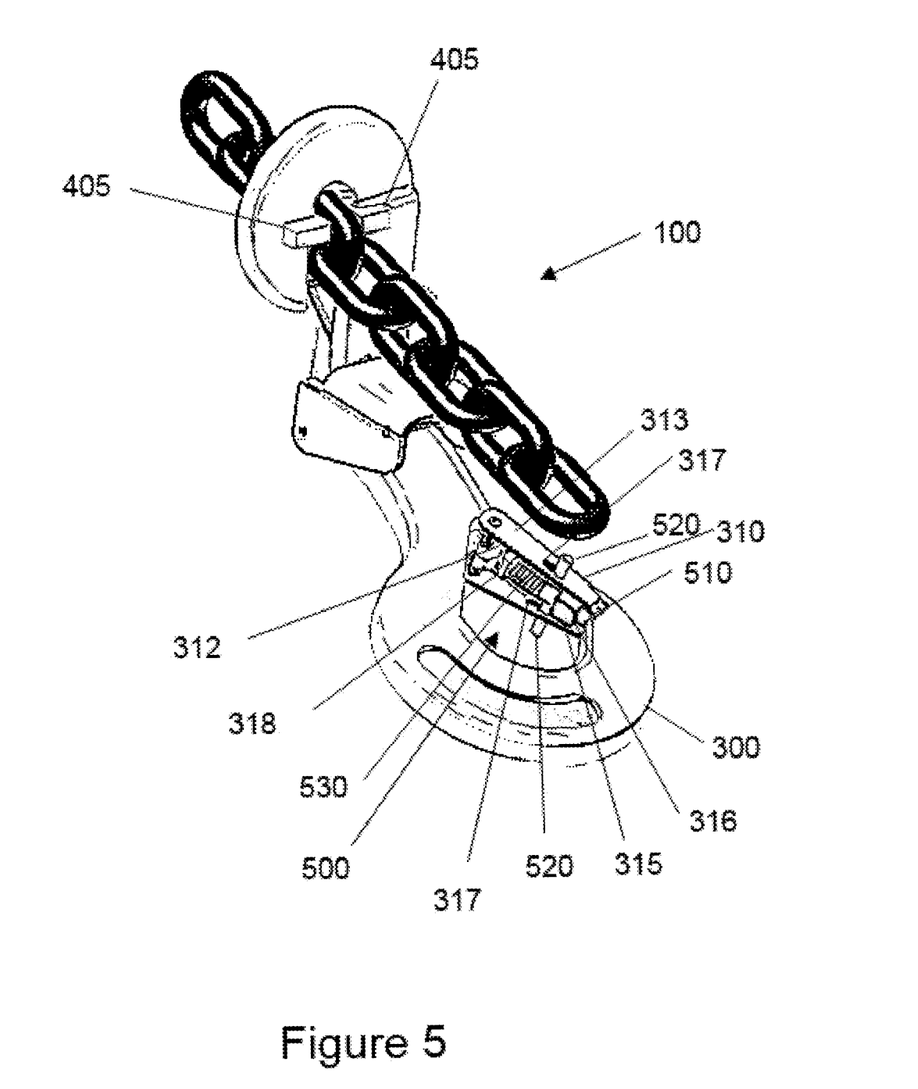
FIG. 5 is a perspective view of a chain hook according to an alternative embodiment of the present invention showing the hook coupled to a chain.

FIG. 5 illustrates an alternative embodiment of the invention showing the second hook 400 of the chain hook 100 coupled to a chain. In this embodiment, second hook comprises a pair of lugs 405 positioned on an underside of the nose portion 401 and tail end 403 of the second hook directly opposing each other. The pair of lugs 405 allow a captive link of the chain in the second hook 400 to swing free such that the links of the hoist or lifting chain are allowed to be kept in alignment.

According to the embodiment of the invention illustrated in FIG. 5, the chain hook 100 comprises at least one safety member associating with the first hook and/or the second hook to prevent accidental release respectively of the load and/or the chain. The one or more safety members is/are designed to prevent rollout of a chain or chain sling which has been attached to the chain hook 100. As shown in FIG. 5, the first hook 300 has a first safety member 500. The first safety member 500 is in the form of a safety pin. The safety pin 500 comprises a pin 510 positioned within the channel 312 of the latch 310 and received within aperture 316 of retaining member 315. The safety pin 500 has a roll pin 520 or rod which protrudes from either side of the pin 510. The roll pin 520 passes through corresponding apertures 317 provided in the side walls 313 of the latch 310. The apertures 317 are elongate apertures which enable the roll pin 520 to slide between a first position and a second position to close and open the safety pin 500. The pin 510 is biased in a closed position via a helical spring 530. A first end of the spring 530 rests against a stop member 318 of the latch 310 and a second end of the spring 530 rests against a groove 540 of the pin 510 of the safety latch 500, shown more clearly in FIG. 6.

Figure 6:
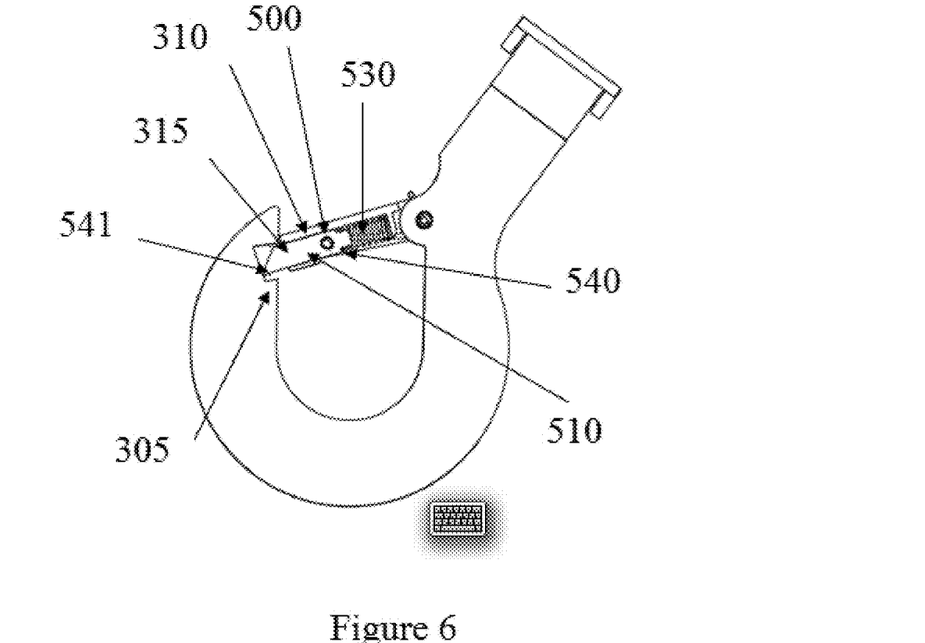
FIG. 6 is a sectional view of a first safety latch of the chain hook shown in FIG. 5.

As illustrated in FIG. 6, a tip 541 of the pin 510 extends beyond the tip 315 of the latch 310 to rest against a lip 305 in the first hook 300 in a closed position. In a closed position, the safety pin 500 prevents the latch 310 being moved into an open position. In an alternative embodiment, it is envisaged that the safety pin 500 can be omitted from the first hook 300.

Figure 7:
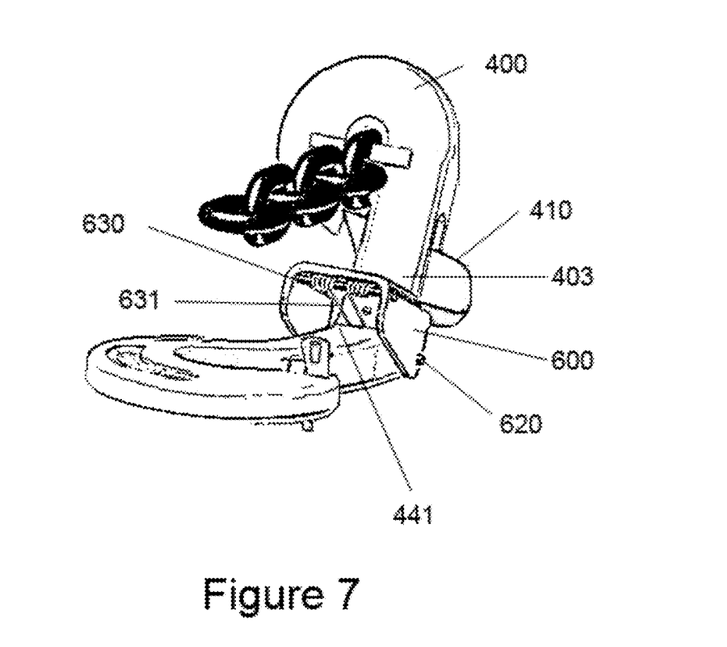
FIG. 7 is an alternative perspective view of the chain hook shown in FIG. 5.

As shown in FIG. 7, the second hook 400 has a second safety member 600 in the form of a safety latch. The safety latch 600 is attached to the second hook 400 via a roll pin 620 or rod to allow the latch 600 to pivot between a first position and a second position. Latch 600 is shown in the first position in FIG. 7. The roll pin 620 is passed through corresponding apertures (not illustrated) provided in the tail end 403 of the second hook 400 and in the safety latch 600 to pivotably attach the latch 600 to the second hook 400 directly beneath and abutting the latch 410. It is envisaged that any other suitable means of attachment which provides a pivotable connection for the latch 600 to the second hook 400 can also be adopted.

The latch 600 is biased in the first position via a torsion spring 630. In the first position, the latch 600 prevents release of the latch 410. In the embodiment illustrated in FIG. 7, the torsion spring 630 is wrapped around the roll pin or rod 620. A groove 441 can be provided in the tail end 403 of the second hook 400 such that a hairpin portion 631 of the torsion spring 630 of the latch 600 can sit within the groove 441 or against the surface of the body 200 of the chain hook 100 to retain the latch 600 in the first position. In an alternative embodiment, it is envisaged that the safety latch 600 can be omitted from the second hook 400.

In further embodiments of the invention, it is envisaged that the chain hook 100 of the present invention can also be coupled to a chain sling which is already loaded. Thus, the chain hook can also be used to add additional items to an existing load.

In use with the first embodiment, locking pin 410 is at least partially withdrawn to allow one or more chains (not illustrated) to be connected to the second hook 400. Once the chain(s) is/are connected to the second hook 400 the locking pin 410 is inserted into a closed position to secure the chain(s) within the second hook 400. The latch 310 of the first hook 300 is moved into an open position to allow a load to be connected to the first hook 300. Release of the latch 310 results in the latch 310 returning to a closed position by the torsion spring 330.

In the embodiment comprising the safety pin 500 shown in FIGS. 5-7, the safety pin 500 must first be moved into an open position by moving the roll pin 520 from the first position to the second position. This enables the pin 510 of the safety pin to slide in a backward direction to enable the latch 310 to be moved into an open position.

For the alternative embodiment shown in FIG. 2, the latch 410 of the second hook 400 is moved into an open position to allow the chain(s) to be located within the second hook 400. Release of the latch 410 results in the latch returning to a closed position by the torsion spring 430.

In the embodiment comprising the safety latch 600 shown in FIGS. 5+7, the safety latch 600 must first be moved into an open position by depressing the latch to move it from the first position to the second position. This enables a rear end of the safety latch 600 to move in a forward direction away from the latch 410 to enable the latch 410 to be moved into an open position.

The elongate body 200 of the chain hook keeps the load away from the chain(s) connected to the second hook 400. Further, as the second hook 400 is inclined at an angle greater than ninety degrees relative to the plane of the elongate body 200, the chain(s) will remain connected to the second hook 200 without escaping even if the locking pin or latch 410 is disengaged.

In another embodiment of the present invention, the body 200 of the chain hook 100 comprises a pivot (not illustrated) which enables the first hook 300 and second hook 400 to pivot relative to each other. Suitably, the pivot is a 180 degree pivot. In an alternative embodiment, the pivot can be a swivel and 180 degree pivot. It is envisaged that the first hook 300 has an eye or loop provided at the tail end 301 of the first hook 300 for connection to a first end of the pivot. A second end of the pivot is connected to the tail end 403 of the second hook 400 such that the first hook 300 and second hook 400 can swivel relative to each other.

Hence, the chain hook 100 of the present invention thus provides a solution to the aforementioned problems of the prior art by providing a chain hook 100 which reduces the risk of disengagement of a chain connected thereto. The forged design of the chain hook 100 reduces the number of components that may need to be replaced or fail as a result of wear and tear. The dual hook configuration of the present invention provides a solution which is stronger, more reliable, less prone to failure and applicable to an increased number of applications compared to the prior art. Further, the dual hook configuration allows balancing of a load to reduce stress placed on components of the hook device and/or an engaged link of a chain.

Throughout the specification the aim has been to describe the invention without limiting the invention to any one embodiment or specific collection of features. Persons skilled in the relevant art may realize variations from the specific embodiments that will nonetheless fall within the scope of the invention.

I claim:

1. A chain hook comprising:
   an elongate body;
   a first hook at a first end of the elongate body for connection to a load; and
   a second hook at a second end of the elongate body for connection to at least one chain;
   wherein the first and second hooks are in different planes, and the second hook comprises a pair of mutually opposed lugs positioned on an underside of a nose portion and a tail end of the second hook whereby a captive link of the chain in the second hook is allowed to swing free such that the links of the chain can be kept in alignment.

2. The chain hook of claim 1, wherein the first hook is in the same plane as the elongate body.

3. The chain hook of claim 1, wherein the second hook is inclined relative to the elongate body and relative to the first hook.

4. The chain hook of claim 3, wherein the second hook is inclined at an angle greater than ninety degrees and less than one hundred and eighty degrees relative to a plane of the elongate body.

5. The chain hook of claim 1, wherein the first hook comprises a first fastening member coupled to a tail end of the first hook for securing connection of the first hook to a load.

6. The chain hook of claim 5, wherein the first fastening member is a latch.

7. The chain hook of claim 6, wherein the latch is attached to the elongate body via a roll pin to allow the latch to pivot between an open position and a closed position.

8. The chain hook of claim 6, wherein the latch is biased in a closed position via a torsion spring.

9. The chain hook of claim 6, wherein a tip of the first hook comprises a recessed portion having a flange for receiving the latch when the latch is in a closed position.

10. The chain hook of claim 6, wherein the latch comprises a slot for receiving the flange of the first hook to resist side loading.

11. The chain hook of claim 1, wherein the second hook comprises a substantially u-shaped hook terminating in a nose portion spaced apart from the elongate body.

12. The chain hook of claim 1, wherein the second hook comprises a second fastening member.

13. The chain hook of claim 12, wherein the second fastening member is a latch.

14. The chain hook of claim 13, wherein the latch is coupled to the body with a pin or rod to allow the latch to pivot between an open position and a closed position.

15. The chain hook of claim 13, wherein the latch is biased to the closed position via a torsion spring within the body.

16. The chain hook of claim 1, wherein the chain hook further comprises at least one safety member associating with the first hook and/or the second hook to prevent accidental release respectively of the load and/or the chain.

17. The chain hook of claim 16, wherein the first hook has a first safety member and the second hook has a second safety member.

18. The chain hook of claim 17, wherein the first safety member is in the form of a safety pin slidable between a closed position and an open position.

19. The chain hook of claim 18, wherein the safety pin comprises a pin slidably positioned within a channel of the latch of the first hook.

20. The chain hook of claim 18, wherein the safety pin has a roll pin or rod which protrudes from either side of the pin and passes through corresponding apertures provided in a pair of side walls of the latch of the first hook.

21. The chain hook of claim 18, wherein the safety pin is biased in a closed position via a helical spring.

22. The chain hook of claim 18, wherein a tip of the safety pin extends beyond a tip of the latch of the first hook to rest against the flange of the first hook when the safety pin is in a closed position.

23. The chain hook of claim 16, wherein the second hook has a second safety member in the form of a safety latch.

24. The chain hook of claim 23, wherein the safety latch is attached to the second hook via a roll pin or rod to allow the safety latch to pivot between a first position and a second position.

25. The chain hook of claim 24, wherein the roll pin is passed through corresponding apertures provided in the tail end of the second hook and in the safety latch to pivotably attach the safety latch directly beneath and abutting the latch of the second hook.

26. The chain hook of claim 25, wherein the safety latch is biased in the first position via a torsion spring to prevent release of the latch of the second hook.

27. The chain hook of claim 12, wherein the second hook comprises an aperture provided in a tail end of the hook for receiving the second fastening member therethrough.

28. The chain hook of claim 12, wherein the second fastening member is a locking pin.

29. The chain hook of claim 28, wherein a nose portion of the second hook has an aperture for retaining an end of the locking pin.

30. The chain hook of claim 29, wherein an opposing end of the locking pin is provided with a ring member to release the locking pin from the closed position.

31. The chain hook of claim 1, wherein the body of the chain hook comprises a pivot which enables the first hook and second hook to pivot relative to each other.

* * * * *